United States Patent [19]
Uchikoga

[11] Patent Number: 5,483,646
[45] Date of Patent: Jan. 9, 1996

[54] MEMORY ACCESS CONTROL METHOD AND SYSTEM FOR REALIZING THE SAME

[75] Inventor: Hiroshi Uchikoga, Hamura, Japan

[73] Assignee: Kabushiki Kaisha Toshiba, Kawasaki, Japan

[21] Appl. No.: 247,399

[22] Filed: May 23, 1994

Related U.S. Application Data

[63] Continuation of Ser. No. 29,998, Mar. 11, 1993, abandoned, which is a continuation-in-part of Ser. No. 557,000, Jul. 25, 1990, abandoned.

[30] Foreign Application Priority Data

Sep. 29, 1989 [JP] Japan .................................. 1-252192

[51] Int. Cl.$^6$ ......................................................... G06F 13/00
[52] U.S. Cl. ..................... 395/427; 364/DIG. 1; 364/232.9; 364/234; 364/234.3; 364/238.2; 364/246.6; 364/248; 364/254.8
[58] Field of Search ..................................... 395/425, 400, 395/325

[56] References Cited

U.S. PATENT DOCUMENTS

| | | | |
|---|---|---|---|
| 3,264,615 | 8/1966 | Case et al. ........................... | 364/DIG. 1 |
| 3,573,855 | 4/1971 | Cragon .................................. | 395/425 |
| 3,742,458 | 6/1973 | Inoue et al. ........................... | 395/425 |
| 4,038,645 | 7/1977 | Birney et al. ......................... | 395/425 |
| 4,183,085 | 1/1980 | Roberts et al. ....................... | 380/23 |
| 4,293,910 | 10/1981 | Flusche et al. ....................... | 395/425 |
| 4,388,695 | 6/1983 | Heinemann ........................... | 395/425 |
| 4,573,119 | 2/1986 | Westheimer et al. ................. | 380/4 |
| 4,627,017 | 12/1986 | Blount et al. ......................... | 395/400 |
| 4,698,750 | 10/1987 | Wilkie et al. ......................... | 395/425 |
| 4,807,119 | 2/1989 | Suga ...................................... | 395/400 |
| 4,849,875 | 7/1989 | Fairman et al. ....................... | 395/425 |
| 4,891,752 | 6/1990 | Fairman et al. ....................... | 395/425 |
| 4,908,789 | 3/1990 | Blockkum et al. .................... | 395/425 |
| 4,926,316 | 5/1990 | Baker et al. ........................... | 395/425 |
| 4,926,322 | 5/1950 | Stimae et al. ......................... | 395/500 |
| 4,974,159 | 11/1990 | Hargrove et al. ..................... | 395/650 |
| 4,999,770 | 3/1991 | Ara et al. .............................. | 395/400 |
| 5,027,273 | 6/1991 | Letwin .................................. | 395/400 |
| 5,051,889 | 9/1991 | Fung et al. ............................ | 395/425 |
| 5,083,259 | 6/1992 | Maresh et al. ........................ | 395/325 |
| 5,101,339 | 3/1992 | Fairman et al. ....................... | 395/400 |
| 5,109,521 | 4/1992 | Culley .................................. | 395/800 |
| 5,226,122 | 7/1993 | Thayer et al. ......................... | 395/275 |
| 5,283,889 | 2/1994 | DeLisle et al. ....................... | 395/500 |

FOREIGN PATENT DOCUMENTS

| | | |
|---|---|---|
| 133568 | 2/1985 | European Pat. Off. . |
| 2539239 | 7/1984 | France . |
| 2595485 | 9/1987 | France . |
| 2070821 | 9/1981 | United Kingdom . |

*Primary Examiner*—Jack B. Harvey
*Assistant Examiner*—Ayaz R. Sheikh
*Attorney, Agent, or Firm*—Finnegan, Henderson, Farabow, Garrett & Dunner

[57] ABSTRACT

Comparators are provided for monitoring a data write request output from CPU to a keyboard controller 113, and a request for inhibiting a memory access of 1 MB or more. Circuits are provided for generating a memory access disabling signal for disabling a memory access of 1 MB or more in response to the detection of the requests by the comparators. The memory access disabling signal is transmitted to the memory and KBC 113.

10 Claims, 2 Drawing Sheets

MEMORY ACCESS CONTROL METHOD AND SYSTEM FOR REALIZING THE SAME

This application is a continuation of application Ser. No. 08/029,998, filed Mar. 11, 1993, now abandoned, which is a continuation of application Ser. No. 07/557,000 filed Jul. 25, 1990, now abandoned.

BACKGROUND OF THE INVENTION

1. Field of the Invention

The present invention relates to a suitable memory access control method and system for realizing the same used in a personal computer.

2. Description of the Related Art

In accordance with the progress of a semiconductor technology, microprocessors and memory LSIs have been supplied at extremely low cost. Also, the performance thereof has been remarkably improved. Particularly in the field of the microprocessor, the bit width has been extended in order that an 8-bit processing, a 16-bit processing, and a 32-bit processing can be simultaneously performed, resulting in a high-speed processing. As such a typical microprocessor, iAPX86 (8086), iAPX88 (8088), iAPX186 (80186), iAPX286 (80286), iAPX386 (80386), manufactured by Intel Corp. U.S.A., have been normally used in the field of the personal computer.

For example, iAPX 286 can be operated in two different modes, that is, a real address mode and a protected virtual address mode. In the real address mode, iAPX286 operates as iAPX86 (8086) with high performance. In this case, memory up to 1 mega bytes (MB) can be accessed. Programs, which are written for iAPX86 or iAPX186, can be executed without making any modifications. Moreover, in the protected mode, a memory access having 1 MB or more can be gained, and all functions of iAPX286 can be performed. These functions include a data protection, a system integration, a task simultaneous processing, and a memory management including a virtual memory. In an initial state after a system reset, a processor starts operating in the real address mode. In the real address mode, all memory addressing is executed as a physical real address. When iAPX286 operates in the real address mode, a memory space of 1 MB ($2^{20}$ bytes) can be addressed similar to the other processors in the iAPX86 family. The physical address is constituted by 20 bits, and each byte in the address space is identified by an inherent address. In other words, the physical addresses are set in the range of 0H-FFFFH. One address is designated by a pointer of 32 bits, and the pointer comprises the following two elements:

(1) 16-bit effective address offset which shows a specific position in a segment as a segment inner displacement in units of bytes; and (2) 16-bit segment selector which shows a start address of the segment.

Since the size of one segment is 64K bytes in maximum, 16-bit (unsigned) effective address offset is sufficient to address an arbitrary one byte in the segment. The offset of the first address in the segment is 0 and the offset of the last address is FFFFH. The 16-bit segment selector designates which part in the physical space of $2^{20}$ bytes the start address of the segment is. In the real address mode, iAPX286 always generates the physical address of 20 bits by the values of the segment selector and the offset.

For example, in a case where an application program, which is prepared by iAPX86 microprocessor, is executed by iAPX286 microprocessor having a memory address space of 1 MB or more, it is necessary to inhibit the memory access of 1 MB or more. In iAPX286 microprocessor, a protection enable bit is provided, iAPX286 is constituted to be operated in the real address mode when the protection enable bit is in a reset state. However, since addresses A0–A24 are electrically provided (an address bus of A0–A24 is provided), there is a possibility that address A20 will become "1" by influence of noise. Accordingly, even in the real address mode, there is a possibility that the memory access to 1 MB or more will be accessed.

A mechanism will now be described for preventing i8036 CPU from accessing a memory of 1 MB or more in the real address mode by using a control signal of a keyboard controller (KBC).

As shown in FIG. 1, for example, if the segment of the memory address is "FFFF" H, and the offset is "FFFF" H (wherein H shows an indication of Hexadecimal), the address computation result exceeds 1 MB. Specifically, since "FFFF" is multiplied by 16 in the segment address and 4-bit-shifted to the left, "FFFF0" and "FFFF" are added. The bit (bit 20 of the memory address) of A20, which indicates 1 MB, becomes 1. In this case, if the microprocessor i8086 is used as CPU, the address bus is constituted by lines A0 to A19 and the address computation result (computation result of the offset address and the segment address) is recognized as "0FFFF" H, and the address returns to the start of the memory and is accessed therefrom.

However, in a CPU using a microprocessor introduced after the i8086, if the address computation result exceeds 1 MB, the microprocessor recognizes this bit because of the presence of A20, memory access of 1 MB or more is performed even if the CPU is in the real address mode. As a result, the program does not normally operate. To eliminate this situation, keyboard controller KBC outputs a control signal in response to a command and data from the CPU. The control signal gates the A20 signal even if the CPU outputs an address exceeding 1 MB or more and the A20 signal is effective as a result of the address computation.

FIG. 2 is a schematic block diagram of the abovementioned and conventional memory access control system. In FIG. 2, a system comprises a CPU 31, a KBC 32, a register (input and output port) 33 in KBC 32, a status register 34 indicating the status of KBC, and AND gate 35 controlling A20 signal. Even if A20 signal is output at "HIGH" level, A20 signal does not pass through the gate 35 and memory of 1 MB or more is not accessed if CPU 31 accesses KBC 32 in advance so that a real signal, which is output from KBC 32, is set at "LOW" level. In other words, changing the REAL signal from "LOW" to "HIGH" means that the mode is changed from the real address mode to the protected virtual address mode. Moreover, changing the real signal from "HIGH" to "LOW" means that the mode is changed from the protected virtual address mode to the real address mode. In this case, to set the REAL signal to "LOW" level, CPU 31 first sends command "D1" H to the register 33 (input and output port having an address of designated by "64" H) in KBC 32 to inform KBC 32 of data write (IOW). At this time, a bit indicating an input buffer full of the status register 34 in KBC 32 becomes "1". After the processing of command "D1" is finished by a firmware provided in KBC 32, this bit becomes "0". After reading this bit of "0", CPU 31 writes data to KBC 32 again. If CPU 31 sends data "DD" H to the input and output (I/O) port "60" H of KBC 32, a REAL signal becomes "LOW". Moreover, if CPU 31 sends data "DF" H thereto, the REAL signal becomes "HIGH."

When the CPU 31 changes the REAL signal for controlling the memory access output from KBC 32 from HIGH to LOW or from LOW to HIGH, the CPU 31 must wait for a period of time from its write request before it can transmit data to KBC 32 and complete the process. It must wait from the time when the CPU 31 sends the write request command to KBC 32 until the time when the CPU 31 is enabled by the KBC 32 to send the data for changing the control signal, i.e., until the processing of the write request command is completed by the KBC 32. In other words, the CPU 31 must wait before it can transmit data to KBC 32 for a period of time during which the "input buffer full" bit remains "1" as a result of the data write command from the CPU 31. It is only when the firmware completes the command processing and sets the "input buffer full" bit to "0" that the CPU 31 is enabled to write data to KBC 32.

SUMMARY OF THE INVENTION

An object of the present invention is to provide a memory control method and a system for realizing the same wherein a change for disabling a memory access of a certain specific range can be performed at a high speed and compatibility with a conventional system can be maintained.

According to a first aspect of the present invention, there is provided a memory access control system in a computer system having a memory, a central processing unit (CPU), a keyboard controller to which an input and output (I/O) port is assigned, comprising: means for detecting predetermined command and data output from said CPU to the I/O port assigned to said keyboard controller; means for generating a specific control signal for disabling a memory access of a certain specific range by said CPU in response to the detections of said command and data; and means for outputting said generated specific control signal to said memory and said keyboard controller.

According to a second aspect of the present invention, there is provided a method for controlling a memory access in a computer system having a memory, a central processing unit (CPU), a keyboard controller to which an input and output (I/O) port is assigned, comprising the steps of: a) transmitting a data write request to said keyboard controller; b) transmitting to said keyboard controller a request for disabling a memory access of a certain specific range without waiting for the response from said keyboard controller; c) monitoring each request transmitted in steps a) and b) and generating a specific control signal for disabling a memory access of a certain specific range; and d) transmitting said specific control signal to said memory and said keyboard controller.

According to the present invention, there are provided functions of monitoring the command and data output from the CPU to the input/output (I/O) port of KBC, processing these command and data without transmitting them to KBC, outputting a REAL signal for controlling a memory address of 1 MB or more, and reflecting the result on KBC. As a result, the change of the REAL signal can be realized by hardware.

The present invention is not constituted such that the CPU sends the command to KBC and then sends data to KBC after the command is processed by the firmware in KBC. More specifically, command and data are not transmitted to KBC. Instead, the command processing by a hardware enables or disenables access to the memory address of 1 MB or more. This brings about a technical advantage in that the changing of the real address mode and the protected virtual address mode is performed at a high speed. Moreover, 100% software compatibility with the conventional system (REAL control using KBC) can be maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
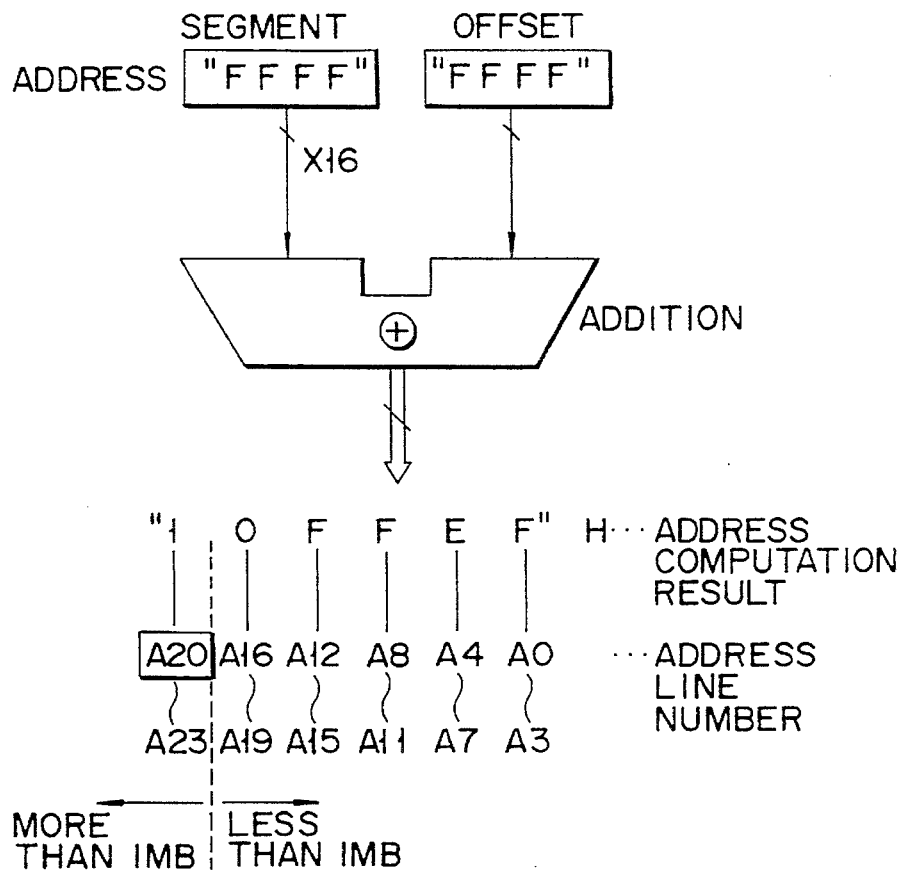
FIG. 1 is a view explaining an address computation result exceeding 1 MB according to prior art.
Figure 2:
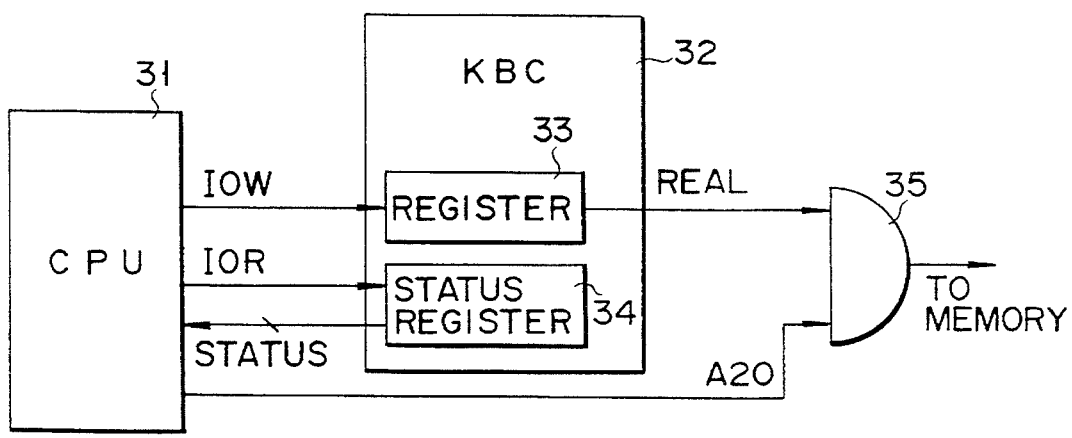
FIG. 2 a block diagram showing a system performing a memory access control of 1 MB or more according to the prior art.
Figure 3:
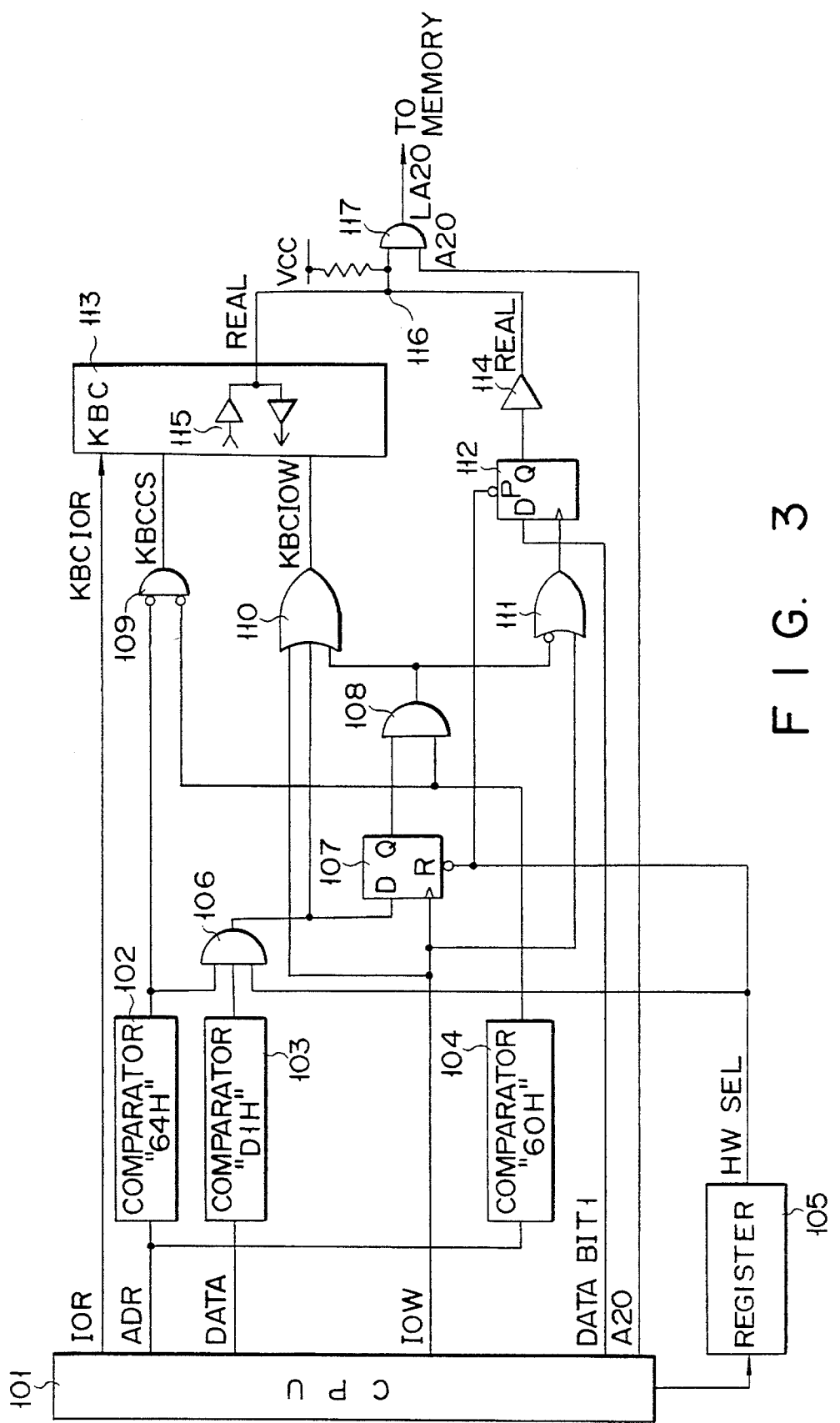
FIG. 3 is a block diagram showing one embodiment of a memory access control system according to the present invention.

A CPU 101 is connected to comparators 102, 103, 104, and a register 105. The comparator 102 detects an address for designating KBC I/O port "64" H. The comparator 103 detects a command data "D1" H. The comparator 104 detects an address for designating KBC I/O port "60" H. The register 105 holds data for designating that CPU 101 performs the output of REAL signal by a hardware control or a KBC control. The selection of the hardware control and the KBC control is performed by a setup processing. The reason the conventional KBC control can be also selected is that the system must function properly when a program, in which CPU 101 is operated at a low speed depending on the application program, is executed. In a case where the hardware control is selected, CPU 101 sets an HWSEL signal of "HIGH" level in the register 105. In a case where KBC control is selected, CPU 101 sets the HWSEL signal of "LOW" level in the register 105. The output signals of the comparators 102, 103 and the HWSEL signal from the register 105 are ANDed by an AND gate 106. By the selection of the hardware control, if the CPU 101 outputs an address for writing a command "D1" in the I/O port "64" H, HWSEL signal from the register 105 and the output signals from the comparators 102 and 103 become "HIGH" and a "HIGH" level signal is output from the gate 106. In contrast, if the KBC control is performed, the output of AND gate 106 becomes "LOW" since HWSEL signal is at "LOW." A D-input terminal of a flip-flop 107 is connected to an output terminal of AND gate 106 and a clock input terminal thereof is connected to the I/O write signal LOW of the CPU 101. When the CPU 101 outputs the above command to enable the I/O write signal LOW ("LOW" active) to, it sets the clock of the flip-flop 107 causing the output Q of the flip-flop 107 to become a "HIGH" level output. In this way the system controls the signals by the hardware control.

On the other hand, in order to perform the KBC control, the flip-flop 107 is reset by HWSEL signal of "LOW" level, and the output thereof becomes "LOW" level. An AND gate 108 is connected to the output Q of the flip-flop 107 and the output of the comparator 104, and these outputs are ANDed. AND gate 108 thus outputs a "HIGH" level signal in a case where CPU 101 outputs the above command and an address of "60" H for the port for writing the active I/O write signals IOW and data. In this way these signals are controlled by the hardware control. In a case where the KBC control is performed, AND gate 108 outputs a "LOW" level signal. An AND gate 109 outputs a chip select signal KBCCS for selecting a KBC 113 when the CPU 101 outputs an address of KBC I/O port. An OR gate 110 is connected to the AND gate 106, the CPU 101, and the AND gate 108. In a case where KBC control is performed, the OR gate 110 outputs an effective KBC I/O write signal KBCIOW of "LOW" level when the CPU 101 writes data in KBC 113. In a case where the hardware control is performed, the OR gate 110 outputs KBC I/O write signal KBCIOW of "HIGH" level to disable the I/O write to the KBC 113. An OR gate 111 is connected to the output of the AND gate 108 and to the CPU 101, and the output of the OR gate becomes "LOW" level when the data is written in the I/O port "60" H by the hardware control.

A flip-flop 112 latches data which determines whether or not the REAL signal is active in the case of the hardware control. The Q output of the flip-flop 112 becomes "LOW" when REAL signal is set to be active (LOW), that is, when the access of 1 MB or more is not performed, and becomes "HIGH" when the access to memory of 1 MB or more is performed. A gate 114 of an open collector output outputs the REAL signal in accordance with the output of the flip-flop 112. An I/O gate 115 comprises an output gate of the open collector output for externally outputting the REAL signal generated by KBC 113, and an input gate for fetching into KBC 113 the REAL signal, which is output from the output gate 114 by the hardware control. The REAL signals, which are supplied from both KBC 113 (I/O gate 115) and the hardware (output gate 114), are wire-ORed by a pulled-up signal line 116. The REAL signal corresponding to the selected control of the KBC control and the hardware control is passed. The other REAL signal corresponding to the control not selected is set to an open (HIGH) state. When the hardware control is performed, the REAL output, which is from KBC 113, is set to the open (HIGH) state in advance. When the hardware control is performed, a command and data for setting the REAL signal output, which is from KBC 113, to the open state (HIGH) in advance. Since the HWSEL signal output from the register 105 becomes "LOW" in the KBC control, the flip-flop 112 is preset, and the output of the output gate 114 becomes "HIGH" to become the open state. The AND gate 117 ANDs A20 signal (bit 20 of the memory address) and the REAL signal on the signal line 116, thereby making it possible to control the memory access of 1 MB or more by using the REAL signal.

The operation of the memory access control by the hardware control will now be described.

If the CPU 101 sets data for selecting the hardware control in the register 105, the HWSEL signal output from the register 105 becomes "HIGH." In this case, if the CPU 101 sends a signal for writing command "D1" into KBC I/O port "64" H, the output signal of the AND gate 106 becomes "HIGH." The flip-flop 107 latches this "HIGH" state in response to the active I/O write signal IOW of "LOW" level, which is supplied from CPU 101. As a result, the flip-flop 107 is set. In a case where the output of AND gate 106 is "HIGH", "HIGH" level signal KBCIOW indicating disabling of KBC I/O write, is output from the OR gate 110. When the CPU 101 reads the status register of KBC 113 by using the KBCIOR signal, the bit indicating the "input buffer full" remains "0". More specifically, it is indicated that the buffer is empty.

When the CPU 101 outputs the I/O address "60" H of KBC 113, the AND gate 108 opens. Thereby, the "HIGH" level signal, which is supplied from the flip-flop 107, is output from the AND gate 108, and the output of the OR gate 111 becomes "LOW." At this time, if bit 1 signal of data, which is written in KBC 113 by the CPU 101, is supplied to the D input of the flip-flop 112, the "bit 1" signal is latched by the flip-flop 112 in response to the "LOW" level signal supplied from the OR gate 111. Therefore, the state of the REAL signal output from the output gate 114, is determined by whether the first bit of data is "HIGH" or "LOW." More specifically, when the data "DD" for setting REAL signal into "LOW" is written in the port address "60" H, data bit 1 becomes "0." In a case where the data "DF" for setting REAL signal into "HIGH" is written, data bit 1 becomes "1" (Note that data bit starts from bit 0). In the hardware control, since REAL signal from the I/O gate 115 in KBC 113, is set to an open state ("HIGH"), which is high impedance in view of the circuit, the REAL signal from the hardware (output gate 114) appears on the signal line 116. The REAL signal on the signal line 116 is supplied to the AND gate together with the A20 signal, and the output from the AND gate 117 of the A20 signal is controlled in accordance with the state of REAL signal. The REAL signal on the signal line 116 is also supplied to KBC 113 (the REAL signal is stored in a predetermined register in KBC 113) by the I/O gate of KBC 113, and the state of the controlled memory access by the hardware control is reflected on KBC 113. The REAL signal is supplied to the KBC 113 in order to make the hardware and the KBC to have the same status. More specifically, if the REAL signal is set to "0", for example, by the hardware control and this change is not transmitted to KBC 113, the KBC 113 determines that the REAL signal is still "1". Therefore, if the KBC 113 performs further processing, an erroneous operation is caused. For this reason, the change of the REAL signal is reflected on the KBC 113.

The memory access control by the KBC control will now be described.

In the KBC control, the HWSEL signal of "LOW" level is output from the register 105, and the flip-flop 107 is reset. As a result, a "LOW" level signal is output from the Q output of the flip-flop 107, and KBC I/O write signal KBCIOW output from the OR gate 110, becomes active ("LOW" active). Thereby, all access from CPU 101 is performed via KBC 113. The flip-flop 112 is preset since the HWSEL signal is "LOW." Thereby, the Q output of the flip-flop 112 is set to "HIGH" level, and the output of output gate 114 is set to "HIGH" level (open), i.e. high impedance from a view point of a circuit. As a result, the REAL signal supplied from the KBC 113 appears on the signal line 16. In the hardware control, the above-mentioned mechanism can also be realized by masking (disabling) a KBC chip select signal.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A memory access control system in a computer system having a memory, comprising:

central processing means for outputting a data write request, and a request for disabling memory access to a limited range of memory space addresses;

a keyboard controller, connected to said central processing means, for selectively outputting a first disable signal which disables access to the limited range of memory space addresses in response to the data write request and the request for disabling memory access;

monitoring means, connected to said central processing means, for detecting the data write request and the request for disabling memory access;

disabling means, connected to said monitoring means, for selectively generating a second disable signal which disables access to the limited range of memory space addresses in response to a detection of the data write request and the request for disabling memory access by said monitoring means; and selecting means, connected to said keyboard controller and said disabling means, for selecting the generation of one of: the first disable signal, and the second disable signal.

2. The memory access control system according to claim 1, wherein said central processing means transmits the request for disabling memory access, to the keyboard controller without waiting for a response to the data write request from said keyboard controller.

3. The memory access control system according to claim 1, wherein the computer system includes means for initializing the system and establishing set-up data, and wherein said selecting means selects one of the first disable signal from said keyboard controller and the second disable signal from said disabling signal generating means, in accordance with selection data established in the set-up data during the system initialization.

4. A memory access control system in a computer system, wherein the computer system includes means for operating in a first address mode where memory access is enabled for address values less than a predetermined limit value, and means for operating in a second address mode where memory access is enabled for address values exceeding the predetermined limit value, said memory access control system comprising:

central processing means for transmitting a request to switch between the first and second address modes;

a keyboard controller including first switching means for switching between the first and second address modes in response to the request to switch from said central processing means;

detecting means, connected between said central processing means and said keyboard controller, for detecting the request to switch between said first and second address modes; and second switching means for switching between said first and second address modes in response to a detection by the detecting means of the request to switch between said first and second address modes.

5. The memory access control system according to claim 4, wherein said first address mode is a real address mode, and said second address mode is a protected virtual address mode.

6. The memory access control system according to claim 4, including means for selectivity activating said first switching means and said second switching means.

7. A memory access control system for a computer system having a memory, including means for initializing the control system and establishing set-up data, the memory access control system comprising:

central processing means, having a real address mode and a protected virtual address mode, for outputting a data write request, a memory address having at least 20 digits, and a request for disabling memory access to a limited range of memory addresses in the real address mode;

keyboard controller means, connected to said central processing means, for selectively outputting a first disable signal which disables memory access to the limited range of memory address in response to the data write request and the request for disabling memory access;

monitoring means, connected to said central processing means, for detecting the data write request and request for disabling memory access;

disabling means, connected to said monitoring means, for selectively generating a second disable signal which disables memory access to the limited range of memory addresses in response to a detection of the data write request and the request for disabling memory access by said monitoring means;

selecting means, connected to said keyboard controller and said disabling means, for selecting one of: the output of the first disable signal and the output of the second disable signal in response to the set-up data; and an AND gate for ANDing the selection of the selecting means with the 20th digit of the memory address output by the central processing means to generate a memory access output signal.

8. A memory access control system comprising:

central processing means, having a real address mode and a protected virtual address mode, for outputting a data write request, a memory address having at least 20 digits, and a request for disabling memory access to a limited range of memory addresses in the real address mode;

monitoring means, connected to said central processing means, for detecting the data write request and request for disabling memory access;

disabling means, connected to said monitoring means, for generating a disable signal which disables memory access to the limited range of memory addresses in response to a detection by said monitoring means of the data write request and the request for disabling memory access, and;

gate means for supplying a memory access disabling signal to a memory in response to the disable signal and the 20th digit of the address output from the central processing unit.

9. A memory access control system in a computer system having a memory and operated in a real address mode and a protected virtual address mode, comprising:

a keyboard controller having a function of outputting a switch signal for selectively switching the real address mode and the protected virtual address mode;

a central processing unit (CPU) for outputting to the keyboard controller a data write request, and a request for switching from the protected virtual address mode to the real address mode;

latch means for latching data for selecting one of the switching by the keyboard controller and a switching by a dedicated controller;

a dedicated controller for selectively switching the real address mode and the protected virtual address mode at a speed faster than that of the keyboard controller, the controller including:

means for detecting the data write request and the request for switching from the protected virtual address mode to the real address mode;

means for gating the data write request and the request for switching from the protected virtual address mode to the real address mode to be supplied to the keyboard controller in response to the detection by the detecting means and the data for selecting the switching by the dedicated controller latched by the latch means; and means for generating a switching signal for switching from the protected virtual address mode to the real address mode and means for selectively outputting the switch signal from the keyboard controller and the switch signal from the dedicated controller in response to the predetermined address.

10. A memory access control system in a computer system having a memory and operated in a real address mode and a protected virtual address mode, comprising:

a keyboard controller having a function of outputting a switch signal for selectively switching the real address mode and the protected virtual address mode;

a central processing unit (CPU) for outputting to the keyboard controller a data write request, and a request for switching from the protected virtual address mode to the real address mode;

latch means for latching data for selecting one of the switching by the keyboard controller and a switching by a dedicated controller;

a dedicated controller for selectively switching the real address mode and the protected virtual address mode at a speed faster than that of the keyboard controller, the controller including:

means for detecting the data write request and the request for switching from the protected virtual address mode to the real address mode;

means for selectively outputting the switch signal from the keyboard controller and the switch signal from the dedicated controller in response to a predetermined address; and means for feeding back the switch signal from the dedicated controller to the keyboard controller when the latch means latches the data selecting the switching by the dedicated controller.

* * * * *